United States Patent [19]

Nagase

[11] Patent Number: 5,428,486
[45] Date of Patent: Jun. 27, 1995

[54] ROTARY HEAD TYPE RECORDING AND REPRODUCING APPARATUS HAVING POSTRECORDING MODE

[75] Inventor: Tetsuo Nagase, Saitama, Japan

[73] Assignee: Pioneer Electronic Corporation, Tokyo, Japan

[21] Appl. No.: 320,843

[22] Filed: Oct. 7, 1994

Related U.S. Application Data

[63] Continuation of Ser. No. 51,645, Apr. 26, 1993, abandoned.

[30] Foreign Application Priority Data

Apr. 27, 1992 [JP] Japan .................................. 4-107662
Apr. 27, 1992 [JP] Japan .................................. 4-107663
Apr. 27, 1992 [JP] Japan .................................. 4-107664

[51] Int. Cl.$^6$ ...................... G11B 15/14; G11B 27/02
[52] U.S. Cl. ......................................... 360/64; 360/13
[58] Field of Search ........................... 360/64, 13, 38.1

[56] References Cited

U.S. PATENT DOCUMENTS

| 4,507,688 | 3/1985 | Fujiki ........................... 360/13 |
| 5,084,786 | 1/1992 | Konno ........................... 360/13 |
| 5,239,422 | 8/1993 | Sakaguchi ................... 360/38.1 X |

FOREIGN PATENT DOCUMENTS

| 0415454 | 3/1991 | European Pat. Off. . |
| 0427008 | 5/1991 | European Pat. Off. . |
| 8700381 | 1/1987 | Germany . |
| 1277318 | 11/1989 | Japan . |
| 1307913 | 12/1989 | Japan . |

OTHER PUBLICATIONS

*Transmission Systems for Communications,* Bell Telephone Laboratories, Inc., 4th Ed. 1971, pp. 563–565.

Primary Examiner—Aristotelis Psitos
Assistant Examiner—Jennifer Pearson Wright
Attorney, Agent, or Firm—Sughrue, Mion, Zinn, Macpeak & Seas

[57] ABSTRACT

An information recording and reproducing apparatus of the rotary head type which is simple in construction and allows, when record data to be re-record are prepared, only the prepared record data to be re-record in a post-recording mode readily. The information recording and reproducing apparatus comprises a digital mixer which replaces data reproduced from a selected portion of a recording medium with record data to be re-recorded, and the resulted data are supplied by way of a recording circuit to a pair of recording magnetic heads so that they are recorded to the selected portion of the recording medium. The recording magnetic heads are mounted on a rotary head at mounting heights lower than a pair of recording and reproducing magnetic heads disposed on the rotary head. The recording magnetic heads are spaced by 90 degrees in phase from the recording and reproducing magnetic heads and have lower edges adjusted to lower edges of record tracks of a recording medium being reproduced by the recording and reproducing magnetic heads.

8 Claims, 8 Drawing Sheets

ROTARY HEAD TYPE RECORDING AND REPRODUCING APPARATUS HAVING POSTRECORDING MODE

This is a continuation of application No. 08/051,645 filed Apr. 26, 1993, which has gone abandoned.

BACKGROUND OF THE INVENTION

1. Field of the Invention

This invention relates to an information recording and reproducing apparatus of the rotary head type such as, for example, a digital audio tape recorder which records a plurality of channels of record data in a two-track completion interleave condition onto a recording medium and reproduces record data recorded in a two-track completion interleave condition on a recording medium.

2. Description of the Prior Art

Information recording and reproducing apparatus of the type mentioned are already known. A typical one of such information recording and reproducing apparatus is a digital audio tape recorder. FIG. 6 shows a general construction of conventional digital audio tape recorders.

Referring to FIG. 6, the conventional digital auto tape recorder shown has an input terminal 1 for receiving an input analog signal. The analog signal received is supplied to a low-pass filter 2 having a cutoff frequency equal to one half the sampling frequency. Thus, the low-pass filter 2 passes therethrough an analog signal component of any frequency of the received analog signal lower than the cutoff frequency.

An analog to digital (A/D) converter 3 converts the analog signal supplied thereto from the low-pass filter 2 into a digital signal, and an error correction code addition circuit 4 interleaves the digital signal (record data) supplied thereto from the analog to digital converter 3 and writes the interleaved digital signal into a RAM provided therein. The error correction code addition circuit 4 then generates a correction code reads out the record data from the RAM, adds the error correction code to the record data, and interleaves and writes the record data back into the RAM. Finally, the error correction code addition circuit 4 outputs the record data successively.

Also some other record data such as a sub code are supplied from a circuit not shown to the error correction code addition circuit 4, written into the RAM, and outputted from the error correction code addition circuit 4.

The record data of 8 bits outputted from the error correction code addition circuit 4 are modulated into record data of 10 bits by an 8–10 modulation circuit 5. The record data of 10 bits from the 8–10 modulation circuit 5 are amplified by a recording amplifier 6 and supplied to a pair of magnetic heads 8a and 8b provided at opposite locations of a rotary head 8 by way of a change-over switch 7. The change-over switch 7 has a contact 7c which is changed over to a contact 7a or another contact 7b when an operation key of an operation section 15 is operated to establish a predetermined operation mode. The contact 7a of the change-over switch 7 is connected to the recording amplifier 6. Meanwhile, the magnetic heads 8a and 8b are connected to the contact 7c of the change-over switch 7.

The low-pass filter 2, the analog to digital converter 3, the error correction code addition circuit 4, the 8–10 modulation circuit 5 and the recording amplifier 6 constitute a recording system of the digital audio tape recorder.

A reproduction amplifier 9 is connected to the contact 7b of the change-over switch 7, and based on reproduction data from the reproduction amplifier 9, a synchronizing signal for controlling a control system, an ATF signal and so forth are generated by a circuit not shown.

A 10–8 demodulation circuit 10 demodulates the reproduction data of 10 bits supplied thereto from the reproduction amplifier 9 into reproduction data of 8 bits. An error detection and correction circuit 11 writes the reproduction data of 8 bits supplied thereto from the 10–8 demodulation circuit 10 once into a RAM therein. The error detection and correction circuit 11 then reads out the reproduction data from the RAM and writes, if the reproduction data have no error, the reproduction data as they are back into the RAM, but corrects, if the reproduction data have an error, the reproduction data and writes them into the RAM. The error detection and correction circuit 11 thereafter outputs the reproduction data successively.

The reproduction data in the form of a digital signal supplied thereto from the error detection and correction circuit 11 are converted into an analog signal by a digital to analog (D/A) converter 12. A low-pass filter 13 receives the analog signal from the digital to analog converter 12 and passes therethrough an analog signal component of any frequency of the received analog signal lower than its cutoff frequency. The output of the the low-pass filter 13 is outputted to an output terminal 14.

Though not shown, the operation section 15 includes a plurality of operation keys for manual operation by the user of the digital audio tape recorder. The operation section 15 is connected by way of a suitable control circuit not shown to the changeover circuit 7 and driving and controlling apparatus not shown of the digital audio tape recorder including a driving apparatus for the rotary head 8 such that the contact 7c of the change-over switch 7 is selectively changed over to the contact 7a or the other contact 7b and the driving and controlling apparatus are selectively put into one of several operation modes in response to operation of one of the operation keys.

A magnetic tape T as a recording medium is transported in the direction indicated by an arrow mark $D_T$, and record data are recorded onto or reproduced from the magnetic tape T by the magnetic heads 8a and 8b of the rotary head 8. The rotary head 8 is rotated in the direction indicated by an arrow mark $D_H$ by the driving apparatus therefor.

In operation, when a recording key, which is one of the operation keys of the operation section 15, is manually operated, the contact 7c of the change-over switch 7 is changed over to the contact 7a to establish a recording mode of the digital audio tape recorder. Consequently, an input analog signal supplied to the input terminal 1 is first processed in such a manner as described above by the recording system and then supplied as record data to the magnetic heads 8a and 8b of the rotary head 8 by way of the change-over switch 7 so that it is recorded onto the magnetic tape T.

On the other hand, when a reproduction key, which is another one of the operation keys of the operation section 15, is manually operated, the contact 7c of the change-over switch 7 is changed over to the contact 7c to establish a reproduction mode of the digital audio tape recorder. Consequently, reproduction data are reproduced from the magnetic tape T by the magnetic heads 8a and 8b and supplied to the reproduction system of the digital audio tape recorder by way of the change-over switch 7. The reproduction data are thus processed in such a manner as described above by the reproduction system and thereafter supplied as an analog signal to the output terminal 14.

FIGS. 7a and 7b illustrate a process if forming recording tracks on a magnetic tape by means of magnetic heads. Referring to FIGS. 7a and 7b, reference character $Tr_a$ denotes a record track formed on the magnetic tape T by the magnetic head 8a, $Tr_b$ another record track formed on the magnetic tape T by the other magnetic head 8b, and $Tr_{a1}$ a further record track, which is formed by final shaping of the record track $Tr_a$ by the magnetic head 8b.

Reference character $D_{HR}$ denotes the direction of transportation of the magnetic heads 8a and 8b, reference characters $L_{1.5a}$ and $L_{1.5b}$ denote center lines of the record tracks $Tr_a$ and $Tr_b$, and reference character $L_{1.0}$ denotes a center line of the record track $Tr_{a1}$.

Reference character $W_{1.5}$ denotes a magnetic head width of the magnetic heads 8a and 8b, that is, a width of the record tracks $Tr_a$ and $Tr_b$, $W_{1.0}$ a width of the record track $Tr_{a1}$, $W_{0.5}$ a width over which the record track $Tr_a$ and the record track $Tr_b$ overlap with each other, and the width $W_{1.0}$ is equal to two thirds the width $W_{1.5}$ while the width $W_{0.5}$ is equal to one third the width $W_{1.5}$.

FIG. 8 is shows an arrangement of record tracks formed on a magnetic tape. Referring to FIG. 8, reference characters $Tr_1$ to $Tr_{24}$ denote record tracks formed finally on the magnetic tape T by the magnetic heads 8a and 8b. Various control data are recorded together with record data of the L and R channels on the record tracks $Tr_1$ to $Tr_{24}$.

It is to be noted that one frame is constituted from record data interleaved on each pair of record tracks $Tr_{(2n-1)}$ and $Tr_{2n}$ and, for example, the record track $Tr_{(2n-1)}$ is recorded or reproduced by the magnetic head 8a while the record track $Tr_{2n}$ is recorded or reproduced by the magnetic head 8b.

Further, for example, odd-numbered data of the L channel and even-numbered data of the R channel are recorded onto the record track $Tr_{(2n-1)}$ while even-numbered data of the L channel and odd-numbered data of the R channel are recorded onto the record track $Tr_{2n}$.

Subsequently, the positions of the magnetic heads upon formation of record tracks and upon reproduction of such record data will be described with reference to FIGS. 7a, 7b and 8.

Referring first to FIG. 7a, the record track $Tr_a$ of the width $W_{1.5}$ is formed by the magnetic head 8a with the equal widths distributed on the left and right sides of the center line $L_{1.5a}$.

Meanwhile, as shown in FIG. 7b, the record track $Tr_b$ of the width $W_{1.5}$ is formed by the magnetic head 8b with the equal widths distributed on the left and right sides of the center line $L_{1.5b}$ such that the record track $Tr_b$ may overlap with a portion of the record track $Tr_a$ having a width equal to one third the width $W_{1.5}$.

Since the record track $Tr_a$ is shaped by the magnetic head 8b in this manner, it finally makes a record track $Tr_{a1}$ having a center line $L_{1.0a}$ displaced from the center line $L_{1.5a}$ of the record track $Tr_a$ with the equal widths distributed on the left and right sides of the center line $L_{1.0a}$.

Also the record track $Tr_b$ is shaped similarly by the magnetic head 8a so that, similarly to the record track $Tr_{a1}$, finally the center line $L_{1.5b}$ thereof is moved to the position of the center line $L_{1.0b}$ to make another record track (not shown) which has the width $W_{1.0}$ with the equal widths distributed on the left and right sides of the center line $L_{1.0b}$.

Consequently, the record tracks $Tr_1$ to $Tr_{24}$ of the width $W_{1.0}$ which is equal to two thirds the width $W_{1.5}$ of the magnetic heads 8a and 8b are formed on the magnetic tape T as shown in FIG. 8.

When the record data are to be reproduced from the magnetic tape T, the centers of the magnetic heads 8a and 8b (centers of the magnetic head widths) trace the center lines $L_{1.01}$ and $L_{1.0b}$ of tracks so that the record data can be reproduced by the magnetic heads 8a and 8b.

Since the conventional information recording and reproducing apparatus of the rotary head type is constructed in such a manner as described above, record data can be recorded onto and reproduced from a magnetic tape.

In a multi-track digital audio tape recorder of the type described above, it sometimes occurs for convenience of use that the user later wants to re-record only for data of a predetermined channel or only for data of a predetermined portion of a predetermined channel.

When re-recording for data is to be performed in this manner, since the data are recorded in an interleaved condition, not only data to be re-recorded but also other record data, that is, all record data corresponding to the record data on the magnetic tape, must be prepared, and the entire data must be re-recorded.

SUMMARY OF THE INVENTION

It is an object of the present invention to provide an information recording and reproducing apparatus of the rotary head type which is simple in construction and allows, when record data to be re-record are prepared, only the prepared record data to be re-record in a post-recording mode readily.

It is another object of the present invention to provide an information recording and reproducing apparatus of the rotary head type which prevents, by whatever number of times re-recording of data is performed for a same portion of a particular record track of a recording medium, another record track positioned forwardly of the particular record track from disappearing and eliminates occurrence of an error at a front or rear portion with respect to the portion of the recording medium for which data have been re-recorded.

In order to attain the objects described, according to the present invention, there is provided an information recording and reproducing apparatus, which comprises a rotary head having a pair of recording and reproducing magnetic heads for recording and reproducing record data onto and from a recording medium in a two-track completion interleave condition, recording circuit means for supplying record data of a plurality of channels in a two-track completion interleave condition to the recording and reproducing magnetic heads, reproducing circuit means for processing record data reproduced by the recording and reproducing magnetic heads, record data replacing means for receiving reproduction data processed by the reproducing means and replacement record data to be re-recorded to a selected portion of a selected channel of record data recorded on a recording medium being reproduced by the rotary head, replacing the received reproduction data at the selected portion of the selected channel of the record data with the replacement record data and outputting the resulted data to the recording circuit means, and a pair of recording magnetic heads disposed on the rotary head at mounting heights lower than the recording and reproducing magnetic heads for recording the record data outputted by the record data replacing means onto the record tracks of the recording medium, from which the corresponding record data have been reproduced by the magnetic heads.

Preferably, the recording magnetic heads are disposed on the rotary head such that lower edges thereof are adjusted to lower edges of record tracks of the recording medium. Alternatively, preferably the recording magnetic heads have a width substantially equal to the width of record tracks of the recording medium.

In the information recording and reproducing apparatus, the record data replacing means receives reproduction data processed by the reproducing means and replacement record data to be re-recorded to a selected portion of a selected channel of the record data recorded on a recording medium being reproduced by the rotary head, and replaces the received reproduction data at the selected portion of the selected channel of the record data with the replacement record data. The resulted data are outputted to the recording circuit means so that they are supplied to the recording magnetic heads. Consequently, the recording magnetic heads re-record the record data outputted from the record data replacing means onto the record tracks of the recording medium, from which the corresponding record data have been reproduced by the recording and reproducing magnetic heads. When the recording magnetic heads re-record the record data in this manner, they record the record data in a condition wherein the lower edges thereof coincide with the lower edges of the record tracks and further with the same width as the record tracks.

Accordingly, with the information recording and reproducing apparatus, only by preparing replacement record data to be re-recorded in a postrecording mode to a selected portion of a selected channel of record data recorded on a recording medium being reproduced by the rotary head, the replacement record data can be recorded readily to the selected portion of the selected channel of the record data on the record medium with a simple construction.

Further, whatever number of times data are re-recorded to the same portion of the record medium, a record track positioned forwardly of the record track for re-recording will not disappear. Furthermore, since a control signal such as an ATF signal can be obtained, occurrence of an error at a front or a rear portion with respect to the portion of the record medium at which data have been re-recorded.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Figure 1:
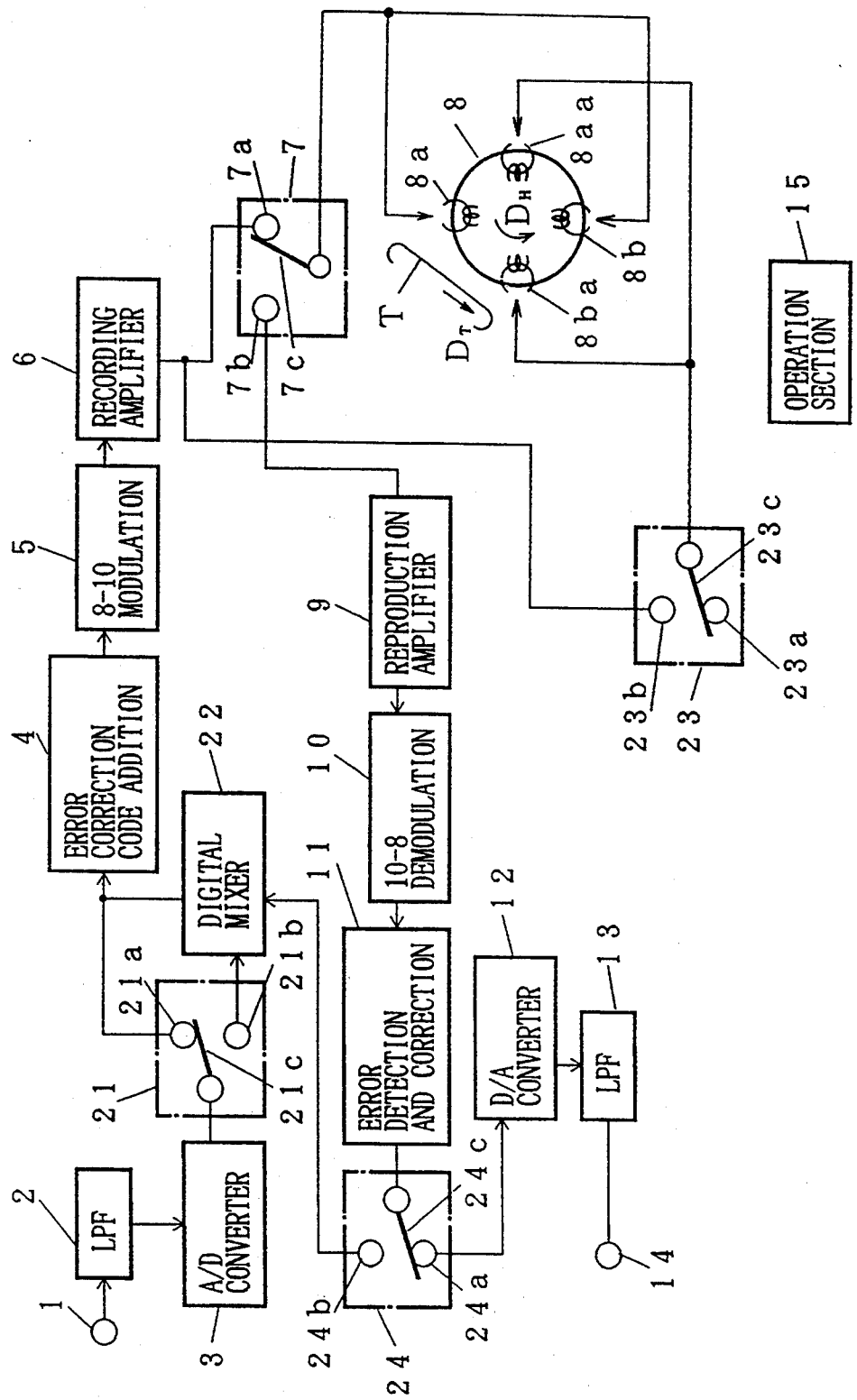
FIG. 1 is a block diagram of a digital audio tape recorder of the rotary head type showing a first preferred embodiment of the present invention.

Referring first to FIG. 1, there is shown a general construction of a digital audio tape recorder as an information recording and reproducing apparatus of the rotary head type to which the present invention is applied.

Figure 6:
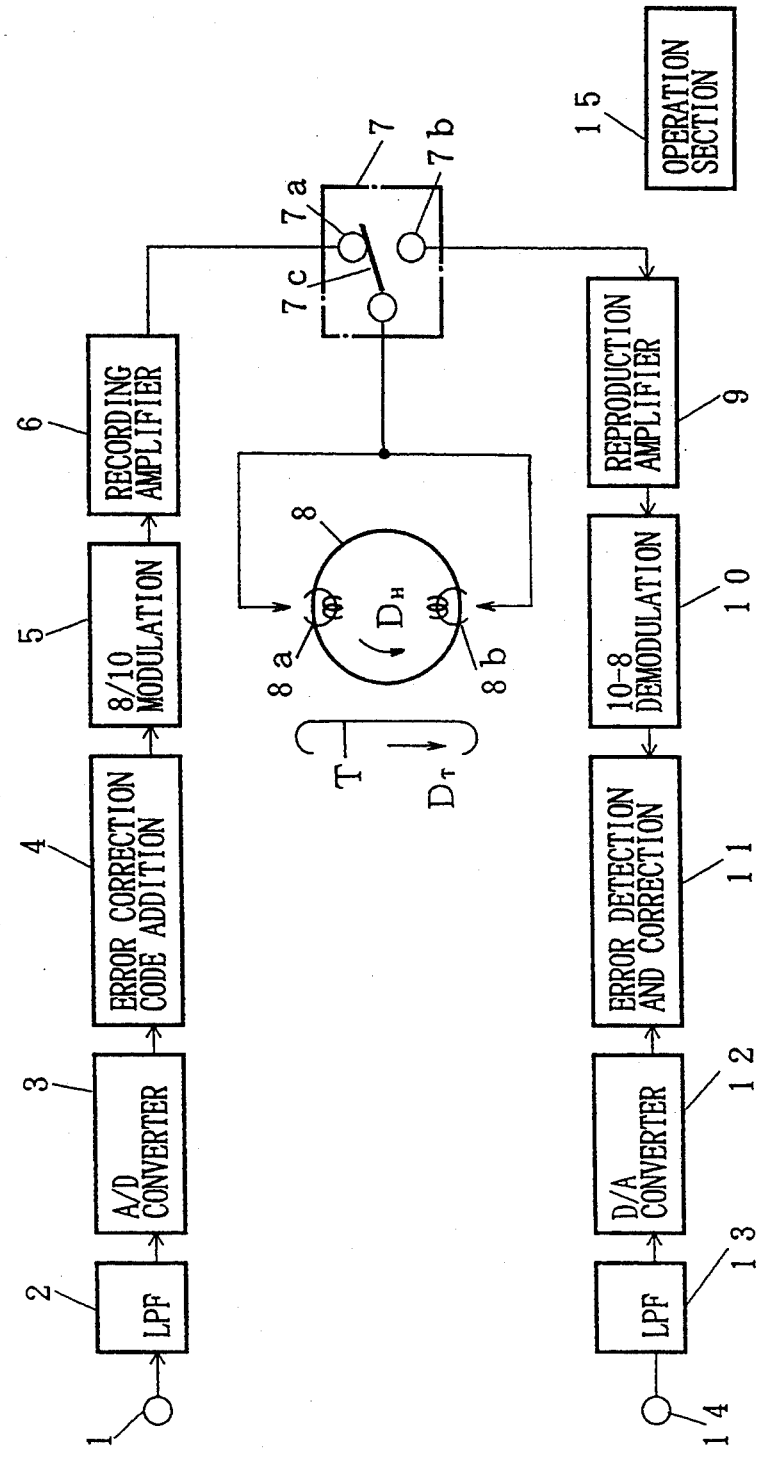
FIG. 6 is a block diagram showing a general construction of a conventional digital audio tape recorder Of the rotary head type.

Similarly to the conventional digital audio tape recorder shown in FIG. 6, the digital audio tape recorder of the present invention has an input terminal 1 and includes a recording system including a low-pass filter 2, an analog to digital (A/D) converter 3, an error correction code addition circuit 4, an 8–10 modulation circuit 5 and a recording amplifier 6, and further has an output terminal 14 and includes a reproducing system including a reproduction amplifier 9, a 10–8 demodulation circuit 10, an error detection and correction circuit 11, a digital to analog (D/A) converter 12 and a low-pass filter 13. The digital audio tape recorder also includes a switch 7 having contacts 7a, 7b and 7c, a rotary head 8 having a pair of magnetic heads 8a and 8b, and an operation section 15 having a plurality of operation keys. The components of the digital audio tape recorder are constructed and operate similarly to those of the conventional digital audio tape recorder described hereinabove, and accordingly, overlapping description of them is omitted herein to avoid redundancy.

The digital audio tape recorder includes an additional pair of data recording magnetic heads 8aa and 8ba provided at the opposite positions of the rotary head 8, for example, at locations displaced by an angle of 90 degrees in phase from the magnetic heads 8a and 8b.

The digital audio tape recorder further includes a change-over switch 21 having three contacts 21a, 21b and 21c. When one of the operation keys of the operation section 15 is manually operated to establish a corresponding one of several operation modes, the contact 21c of the change-over switch 21 is changed over to the contact 21a or the other contact 21b. The contact 21a of the change-over switch 21 is connected to the error correction code addition circuit 4 while the contact 21c of the change-over switch 21 is connected to the analog to digital converter 3.

The digital audio tape recorder further includes a digital mixer 22 which serves as record data replacing means. The digital mixer 22 compares data supplied thereto from the contact 21b of the change-over switch 21, that is, record data to be re-recorded, and data supplied thereto from the error detection and correction circuit 11 by way of another change-over switch which will be hereinafter described, that is, reproduction data. Then, if the reproduction data are data to be replaced, the digital mixer 22 replaces the reproduction data with the record data to be re-recorded and outputs the resulted data to the error correction code addition circuit 4, but if the reproduction data are not data to be replaced, the reproduction data supplied from the error detection and correction circuit 11 to the digital mixer 22 are outputted as they are as record data to the error correction code addition circuit 4.

The digital audio tape recorder further includes a further change-over switch 23 having three contacts 23a, 23b and 23c. When one of the operation keys of the operation section 15 is manually operated to establish one of the operation modes, the contact 23c of the change-over switch 23 is changed over to the contact 23a or the contact 23b. The contact 23b is connected to the recording amplifier 6 while the contact 23c is connected to the magnetic heads 8aa and 8ba of the rotary head 8.

The change-over switch 24 has three contacts 24a, 24b and 24c. When one of the operation keys of the operation section 15 is manually operated to establish a corresponding one of the modes, the contact 24c of the change-over switch 24 is changed over to the contact 24a or the other contact 24b. The contact 24a of the change-over switch 24 is connected to the digital to analog converter 19 while the contact 24b is connected to the digital mixer 22 and the contact 24c is connected to the error detection and correction circuit 11.

In operation, when a recording key, which is one of the operation keys of the operation section 15, is manually operated, the contact 21c of the change-over switch 21 is changed over to the contact 21a; the contact 7c of the change-over switch 7 is changed over to the contact 7a; and the contact 23c of the changeover switch 23a is changed over to the contact 23, thereby to establish a recording mode of the digital audio tape recorder. Consequently, an analog signal supplied to the input terminal 1 is processed by predetermined processing by the recording system and then supplied as record data to the magnetic heads 8a and 8b of the rotary head 8 by way of the change-over switch 7 so that it is recorded onto a magnetic tape T being fed in the direction indicated by an arrow mark $D_T$ while the rotary head 8 is rotated in the direction indicated by an arrow mark $D_H$.

Figure 8:
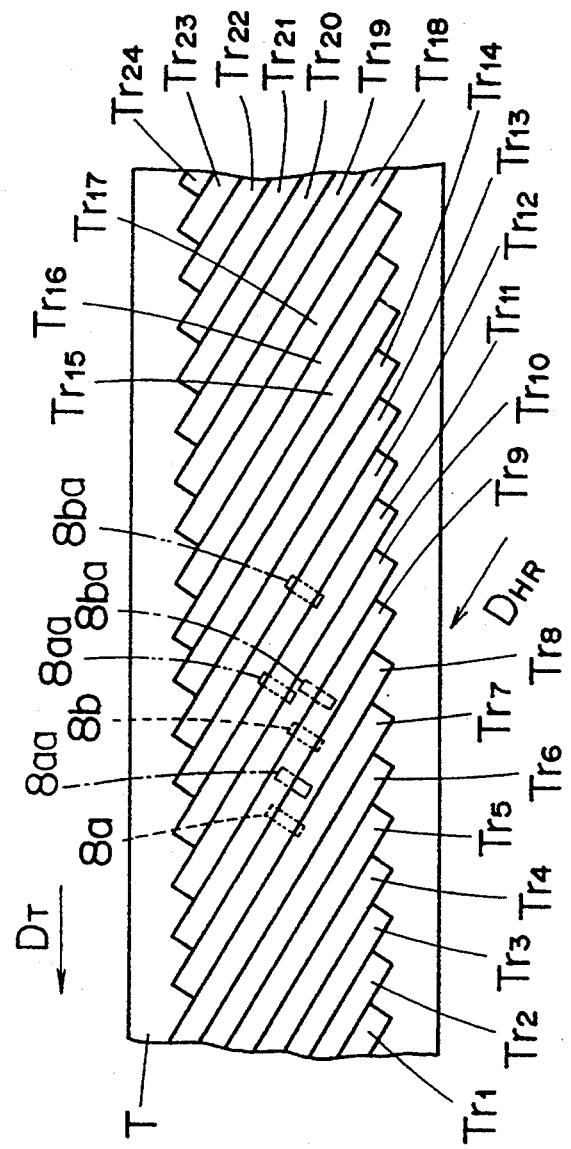
FIG. 8 is a diagrammatic view illustrating an arrangement of record tracks formed on a magnetic tape.

Accordingly, record tracks such as the record tracks $Tr_1$ to $Tr_{24}$ shown in FIG. 8 are formed on the magnetic tape T by the magnetic heads 8a and 8b with the record data recorded thereon.

It is to be noted that, in the present recording mode, the contact 24c of the change-over switch 24 may be connected to the contact 24a or the contact 24b.

On the other hand, when a reproduction key, which is another one of the operation keys of the operation section 15, is manually operated, the contact 7c of the change-over switch 7 is changed over to the contact 7b; the contact 23c of the change-over switch 23 is changed over to the contact 23a; and the contact 24c of the change-over switch 24 is changed over to the contact 24a, thereby to establish a reproduction mode. Consequently, reproduction data reproduced from the magnetic tape T by the magnetic heads 8a and 8b are supplied by way of the change-over switch 7 to and processed by predetermined processing by the reproduction system. The thus processed reproduction data are supplied as an analog signal to the output terminal 14.

Accordingly, record data can be reproduced from the magnetic tape T by the magnetic heads 8a and 8b.

It is to be noted that, in the reproduction mode, the contact 21c of the change-over switch 21 may be connected to the contact 21a or the contact 21b.

When a postrecording key, which is a further one of the operation keys of the operation section 15, is manually operated, the contact 21c of the change-over switch 21 is changed over to the contact 21b; the contact 7c of the change-over switch V is changed over to the contact 7b; the contact 23c of the change-over switch 23 is changed over to the contact 23b; and the contact 24c of the change-over switch 24 is changed over to the contact 24b, thereby to establish a postrecording mode. Consequently, reproduction data from the magnetic heads 8a and 8b are supplied from the error detection and correction circuit 11 to the digital mixer 22 by way of the change-over switch 24.

In this instance, record data to be re-recorded are simultaneously supplied also from the analog to digital converter 3 to the digital mixer Consequently, the digital mixer 22 replaces the record data only at a portion of the reproduction data corresponding to the data to be re-recorded with the record data to be re-recorded and outputs the resulted record data to the error correction code addition circuit 4. Consequently, the record data are supplied to the magnetic heads 8aa and 8ba by way of the 8–10 modulation circuit 5, the recording amplifier 6 and the change-over switch 23.

Accordingly, such new record tracks $Tr_1$ to $Tr_{24}$ with the data partially replaced as shown in FIG. 8 are formed on the magnetic tape T by the magnetic heads 8aa and 8ba, thereby re-recording the record data.

It is to be noted that, in the postrecording mode, the mounting heights of the magnetic heads 8aa and 8ba are set lower than those of the magnetic heads 8a and 8b, respectively, and lower edges of the magnetic heads 8aa and 8ba are aligned with lower edges of record tracks from which record data have been reproduced as hereinafter described, and consequently, record data can be re-recorded by the magnetic heads 8aa and 8ba at the same positions as those of the record tracks which have been traced respectively by the magnetic heads 8a and 8b, which will reproduce the record data, thereby to form new record tracks.

Figure 2:
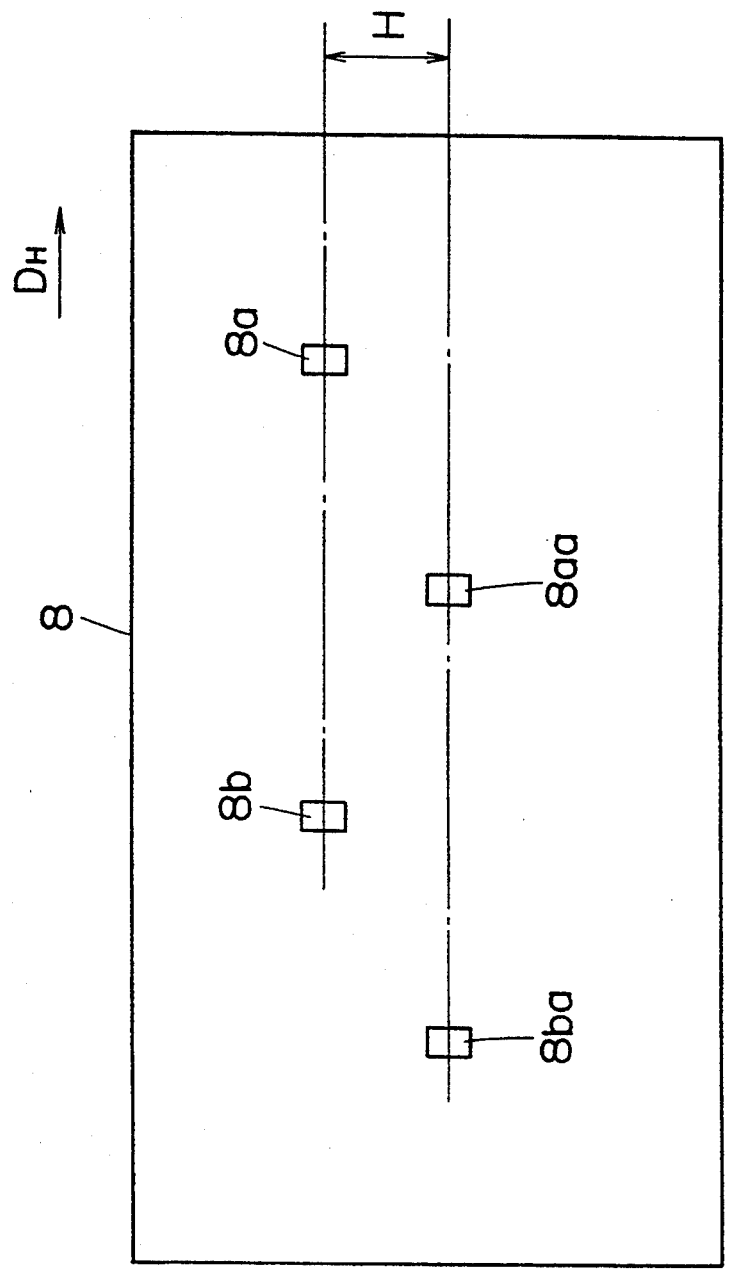
FIG. 2 is a schematic developed view of a rotary head of the information recording and reproducing apparatus of FIG. 1 illustrating a positional relationship of magnetic heads.

FIG. 2 illustrates the positional relationship of the magnetic heads. Referring to FIG. 2, reference. character H denotes a difference in mounting height of the magnetic heads 8aa and 8ba from the magnetic heads 8a and 8b.

Figure 3:
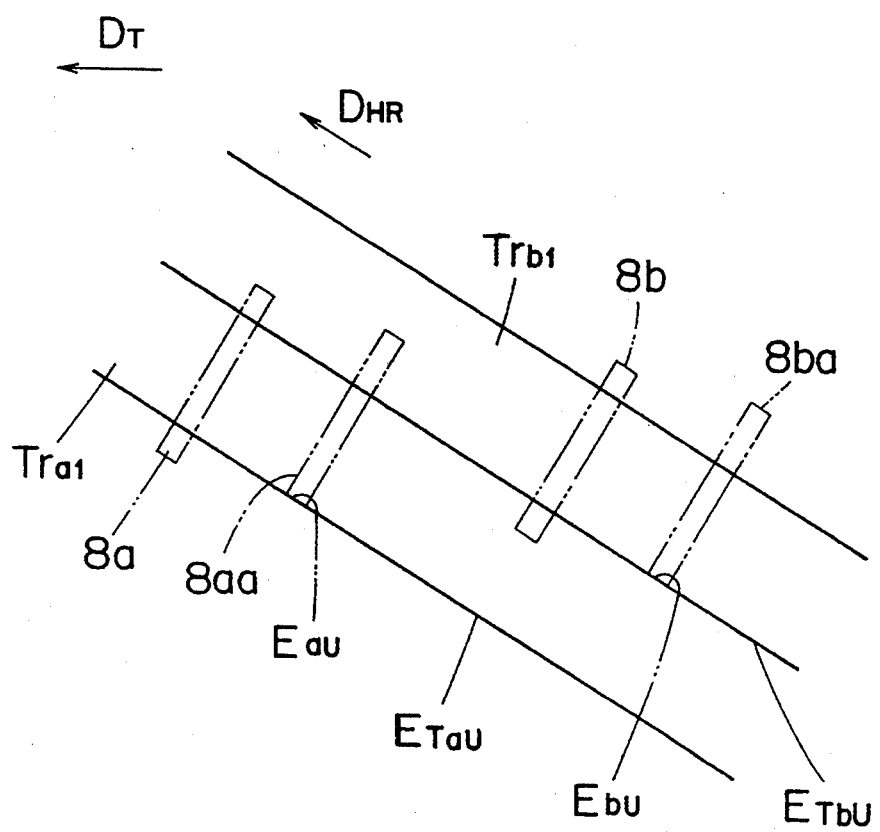
FIG. 3 is a diagrammatic view illustrating a relationship between the magnetic heads of FIG. 2 and record tracks formed by the magnetic heads.

Meanwhile, FIG. 3 illustrates the relationship between the magnetic heads and record tracks. Referring to FIG. 3, reference character $Ea_u$ denotes a lower edge of the magnetic head 8aa, $Eb_u$ a lower edge of the magnetic head 8ab, $E_{TaU}$ a lower edge of a record track $Tr_{a1}$, and $E_{TbU}$ a lower edge of another record track $Tr_{b1}$.

Subsequently, a difference in mounting height provided between the magnetic heads will be described.

Figure 7A:
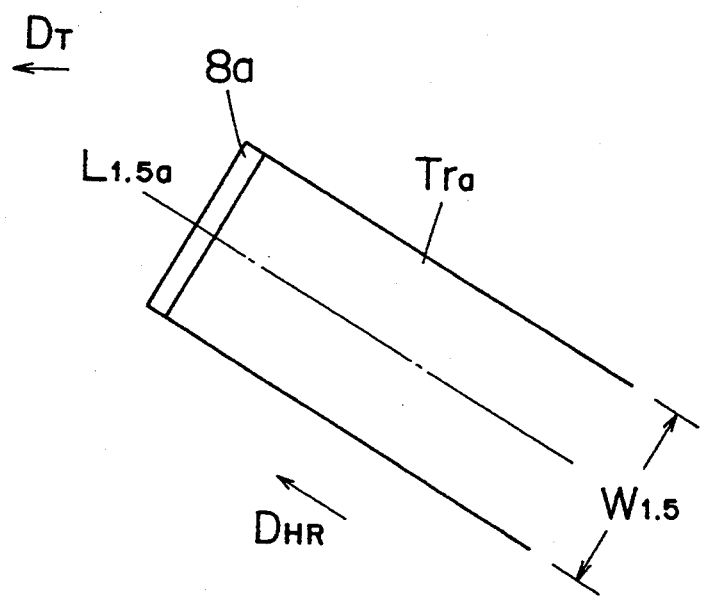
FIGS. 7a and 7b are diagrammatic views illustrating a procedure of forming record tracks on a magnetic tape by a pair of magnetic heads.
Figure 7B:
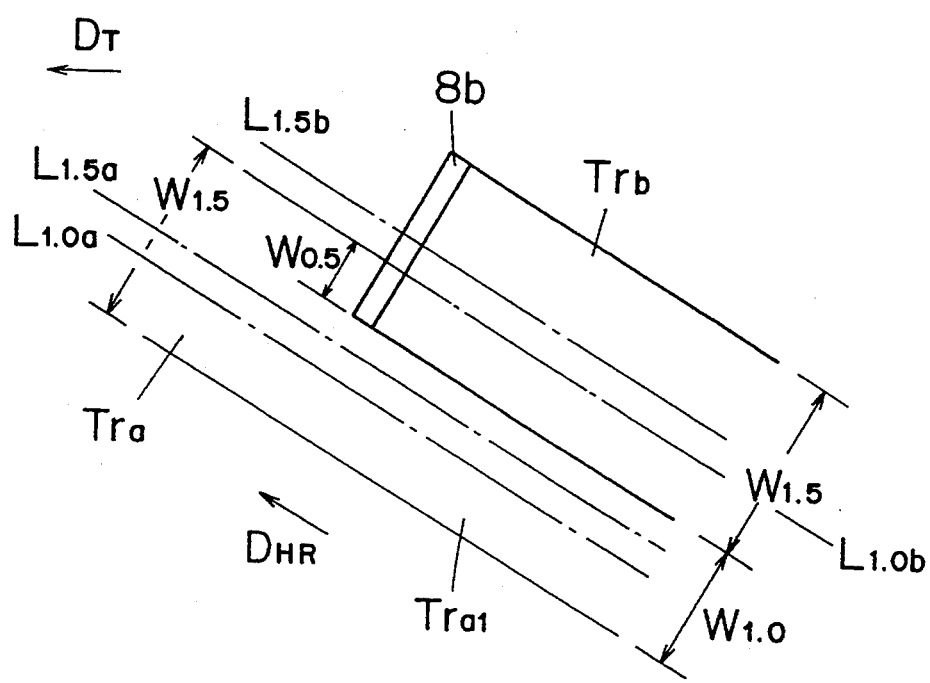

First, if the magnetic heads 8a and 8b and the magnetic heads 8aa and 8ba are set to the same mounting heights, then since the magnetic heads 8a and 8b and the magnetic heads 8aa and 8ba are positioned at different locations displaced by an angle of 90 degrees in phase from each other, as can be seen from FIGS. 7a and 7b, even if the magnetic heads 8a and 8b trace the record tracks $Tr_8$ and $Tr_9$ in a condition wherein the centers thereof coincide with the centers of the record tracks $Tr_8$ and $Tr_9$ (which correspond to the center lines $L_{1.0a}$ and $L_{1.0b}$ shown in FIG. 7b), respectively, the centers of the magnetic heads 8aa and 8ba will be displaced from the centers of the record tracks $Tr_8$ and $Tr_9$ as indicated by alternate long and short dash lines in FIG. 8.

Then, in order to effect postrecording, time is required for processing a signal after data are reproduced until the data are re-recorded as described hereinabove, and accordingly, if the time required for processing a signal is taken into consideration, then even if the magnetic heads 8a and 8b trace the magnetic tracks $Tr_8$ and $Tr_9$ in a condition wherein the centers thereof indicated by broken lines coincide with the centers of the record tracks $Tr_8$ and $Tr_9$, the centers of the magnetic heads 8aa and 8ba will be positioned, for example, on record tracks $Tr_{11}$ and $Tr_{12}$ as indicated by alternate long and two short dashes lines.

In order to remove such a delay in time as described above, it is necessary to make the centers of the magnetic heads 8aa and 8ba coincide with the centers of the record tracks $Tr_8$ and $Tr_9$ traced by the magnetic heads 8a and 8b, that is, to displace (to change the mounting heights of) the magnetic heads 8aa and 8ba so that the centers thereof may coincide with the centers of the record tracks $Tr_8$ and $Tr_9$, respectively.

However, even if the magnetic heads 8aa and 8ba are displaced merely so that the centers thereof may coincide with the centers of the record tracks $Tr_8$ and $Tr_9$, respectively, since the magnetic heads 8aa and 8ba used normally have the same construction (structure) as the magnetic heads 8a and 8b, the magnetic heads 8aa and 8ba have the same width as the width $W_{1.5}$ of the magnetic heads 8a and 8b.

If the magnetic heads 8aa and 8ba having the same width as the width $W_{1.5}$ of the magnetic heads 8a and 8b are used and the beginning one of record tracks onto which data are to be re-recorded is the record track $Tr_8$, then since the center line $L_{1.0a}$, is displaced from the center line $L_{1.5a}$, as described hereinabove with reference to FIGS. 7a and 7b, the magnetic head 8aa will overlap with a preceding record track $Tr_7$ over a width equal to one fourth the width (width $W_{1.0}$) of the record track $Tr_7$.

Accordingly, if data are re-recorded in this condition, then since the width of the record track $Tr_7$ is equal to three fourths the original width, if re-recording of data is performed twice at the same location, then the width of the record track $Tr_7$ is reduced to one half the original width. Further, if re-recording of data is performed three times at the same location, then the width of the record track $Tr_7$ is reduced to one fourth the original width, and further if re-recording of data is performed four times at the same location, then the record track $Tr_7$ disappears.

In order to prevent the record track $Tr_6$ from disappearing as a result of re-recording of data performed by a number of times at the same location in this manner, the lower edge $Ea_U$ of the magnetic head 8aa is adjusted to the lower edge $E_{TaU}$ of the record track $T_{ra1}$ and the lower edge $Eb_U$ of the magnetic head 8ab is adjusted to the lower edge $E_{TbU}$ of the record track $T_{rb1}$ as shown in FIG. 3. Consequently, the record track $Tr_6$ remains in its original condition and will not disappear.

Where the mounting height of the magnetic heads 8aa and 8ba is set lower by the difference H than that of the magnetic heads 8a and 8b in order to displace the centers of the magnetic heads 8aa and 8ba in such a manner as described above, the magnetic heads 8aa and 8ba can trace record tracks traced by the magnetic heads 8a and 8b in a condition wherein the centers thereof coincide with the centers of the record tracks.

If the difference H in mounting height described above is represented with the width $W_{1.0}$ of record tracks, then $$H = (2n+0.5)W_{1.0} \text{ or } (2n+1.5)W_{1.0}$$

where n is an integer equal to or greater than 0 and is determined taking the time required for processing a signal described above into consideration. When the magnetic heads 8aa and 8ba are provided on the downstream side of the magnetic head 8 with respect to the magnetic heads 8a and 8b (the positional relationship illustrated in FIG. 1), the difference H is given by $(2n+0.5)W_{1.0}$, but when the magnetic heads 8aa and 8ba are mounted on the upstream side of the magnetic head 8 with respect to the magnetic heads 8a and 8b (the positional relationship opposite to the positional relationship of the magnetic head 8aa and the magnetic head 8ba illustrated in FIG. 1), the difference H is given by $(2n+1.5)W_{1.0}$.

As described above, according to the embodiment of the present invention described above, with the simple construction that the magnetic heads 8aa and 8ba are provided additionally on the rotary head 8, if only record data to be re-recorded are prepared, then the record data to be re-recorded can be re-recorded simply in a postrecording mode onto a track for which such rewriting is required.

Further, since the magnetic heads 8aa and 8ba are disposed with such a difference H as described above with respect to the magnetic heads 8a and 8b, whatever number of times data are re-recorded at the same portion of the magnetic tape T, a record track positioned forwardly of the record track for re-recording will not disappear. Further, since a control signal such as an ATF signal can be obtained, occurrence of an error at a front or a rear portion with respect to the portion of the magnetic tape T at which data have been re-recorded can be eliminated.

Figure 4:
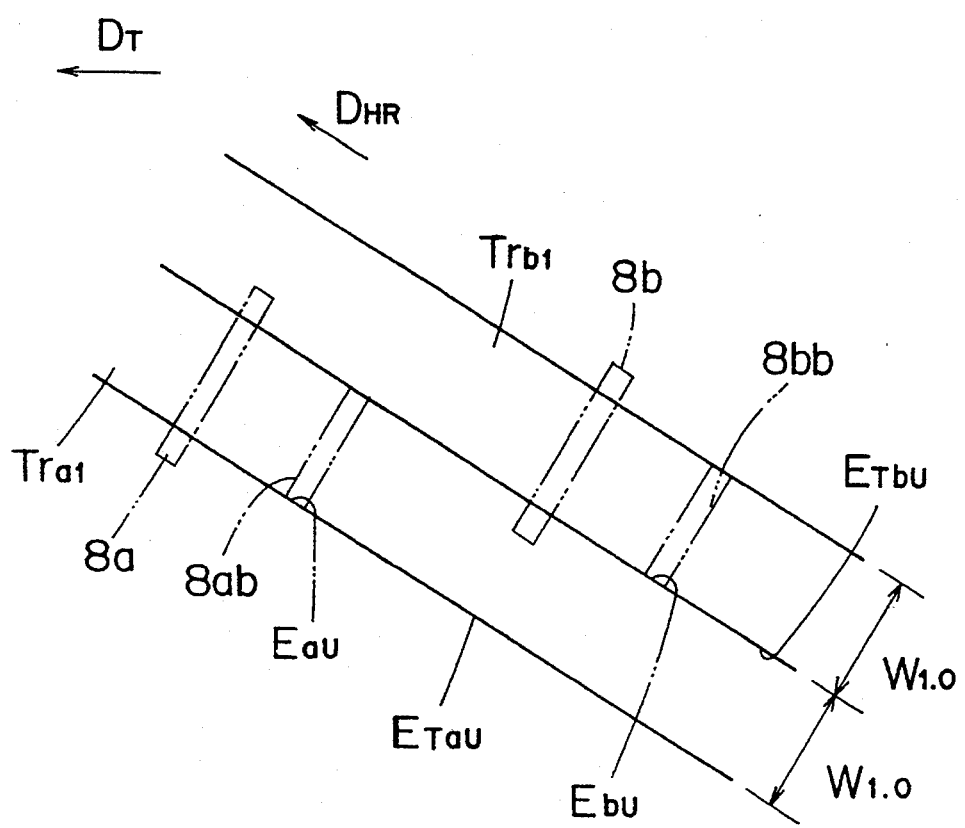
FIG. 4 is a similar view but illustrating another relationship between the magnetic heads of FIG. 2 and record tracks formed by the magnetic heads.

FIG. 4 shows a modification to the magnetic head arrangement shown in FIG. 3. Referring to FIG. 4, the modified magnetic head arrangement shown includes a pair of data recording magnetic heads 8ab and 8bb in place of the data recording magnetic heads 8aa and 8ba of the magnetic head arrangement shown in FIG. 3. The data recording magnetic heads 8ab and 8bb have a width equal to two thirds the width $W_{1.5}$ of the magnetic heads 8a and 8b, that is, the width $W_{1.0}$, which is equal to the width of record tracks $Tr_{a1}$ and $Tr_{b1}$, and are disposed such that, similarly to the magnetic heads 8aa and 8ba of the magnetic head arrangement shown in FIG. 3. a lower edge $Ea_U$ of the magnetic head 8ab is adjusted to a lower edge $E_{TaU}$ of the record track $Tr_{a1}$ while a lower edge $Eb_U$ of the magnetic head 8bb is adjusted to a lower edge $E_{TbU}$ of the record track $Tr_{b1}$. Consequently, with the modified magnetic head arrangement, even if re-recording is performed for the record track Tr$_7$, the record track Tr$_6$ described hereinabove with reference to FIG. 8 will remain as they are and will not disappear, and all re-recorded tracks will be formed at the same positions with the same widths as those prior to such re-recording.

Figure 5:
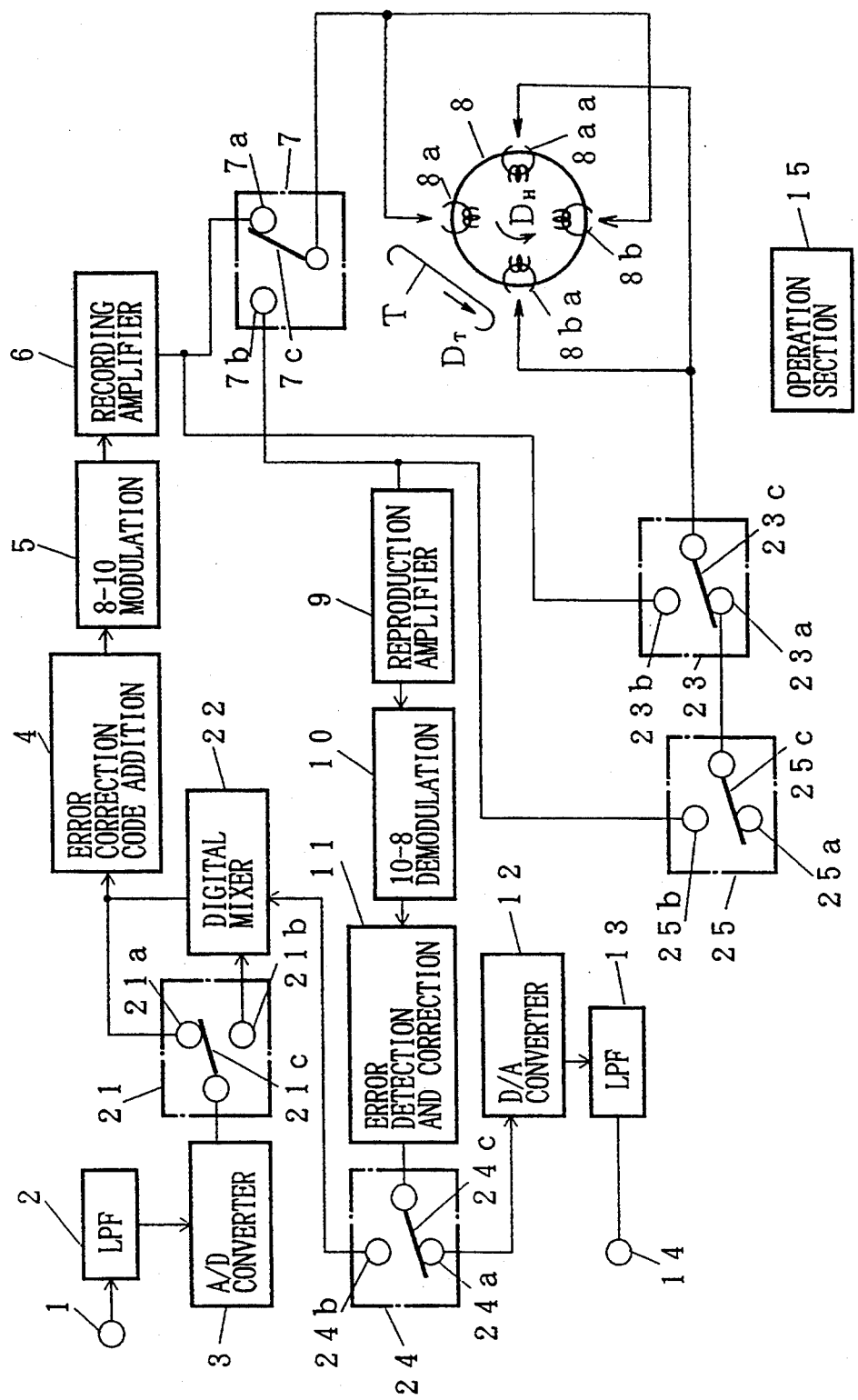
FIG. 5 is a block diagram of another digital audio tape recorder of the rotary head type showing a second preferred embodiment of the present invention.

Referring now to FIG. 5, there is shown a general construction of another digital audio tape recorder of the rotary head type to which the present invention is applied. The digital audio tape recorder shown is a modification to and is only different from the digital audio tape recorder described hereinabove with reference to FIG. 1 in that it additionally includes a change-over switch 25. The change-over switch 25 has three contacts 25a, 25b and 25c, and when one of the operation keys of the operation section 15 is manually operated to establish a corresponding one of the modes, the contact 25c thereof is changed over to the contact 25a or the other contact 25b. The contact 25b is connected to the recording amplifier 6 while the contact 25c is connected to the contact 23a of the change-over switch 23.

An operation, when the recording key of the operation section 15 is manually operated, then the contact 21c of the change-over switch 21 is changed over to the contact 21a; the contact 7c of the change-over switch 7 is changed over to the contact 7a; the contact 23c of the change-over switch 23 is changed over to the contact 23a; and the contact 25c of the change-over switch 25 is changed over to the contact 25a, thereby to establish a recording mode of the digital audio tape recorder. Consequently, an analog signal supplied to the input terminal 1 is processed by predetermined processing by the recording system and then supplied as record data to the magnetic heads 8a and 8b of the rotary head 8 by way of the change-over switch 7 so that it is recorded onto a magnetic tape T being fed in the direction indicated by an arrow mark D$_T$ while the rotary head 8 is rotated in the direction indicated by an arrow mark D$_H$.

Accordingly, record tracks such as the record tracks Tr$_1$ to Tr$_{24}$ shown in FIG. 8 are formed on the magnetic tape T by the magnetic heads 8a and 8b with the record data recorded thereon.

It is to be noted that, in the present recording mode, the contact 24c of the change-over switch 24 may be connected to the contact 24a or the contact 24b.

On the other hand, when the reproduction key of the operation section 15 is manually operated, the contact 7c of the change-over switch 7 is changed over to the contact 7b; the contact 23c of the change-over switch 23 is changed over to the contact 23a; and the contact 24c of the change-over switch 24 is changed over to the contact 24a, thereby to establish a reproduction mode. Consequently, reproduction data reproduced from the magnetic tape T by the magnetic heads 8a and 8b are supplied by way of the change-over switch 7 to and processed by predetermined processing by the reproduction system. The thus processed reproduction data are supplied as an analog signal to the output terminal 14.

Accordingly, record data can be reproduced from the magnetic tape T by the magnetic heads 8a and 8b.

It is to be noted that, in the reproduction mode, the contacts 21c and 25c of the change-over switches 21 and 25 may be connected to the contacts 21a and 25a or the contacts 21b and 25b.

When the postrecording key of the operation section 15 is manually operated, the contact 21c of the change-over switch 21 is changed over to the contact 21b; the contact 7c of the change-over switch 23 is changed over to the contact 23b; and the contact 24c of the change-over switch 24 is changed over to the contact 24b, thereby to establish a postrecording mode. Consequently, data reproduced from the magnetic tape T by the magnetic heads 8a and 8b are supplied from the error detection and correction circuit 11 to the digital mixer 22 by way of the change-over switch 24.

In this instance, record data to be re-recorded are simultaneously supplied also from the analog to digital converter 3 to the digital mixer Consequently, the digital mixer 22 replaces the record data only at a portion of the reproduction data corresponding to the data to be re-recorded with the record data to be re-recorded and outputs the resulted record data to the error correction code addition circuit 4. Consequently, the record data are supplied to the magnetic heads 8aa and 8ba by way of the 8-10 modulation circuit 5, the recording amplifier 9 and the change-over switch 23.

Accordingly, such record tracks Tr$_1$ to Tr$_{24}$ with data partially replaced as shown in FIG. 8 are formed on the magnetic tape T by the magnetic heads 8aa and 8ba, thereby re-recording the record data.

It is to be noted that, in the postrecording mode, the contact 25c of the change-over switch 25 may be connected to the contact 25a or the contact 25b.

Further, when a monitor key, which is a still further one of the operation keys of the operation section 15, is manually operated, the contact 21c of the change-over switch 21 is changed over to the contact 21a; the contact 7c of the change-over switch 7 is changed over to the contact 7a; the contact 23c of the change-over switch 23 is changed over to the contact 23a; the contact 24c of the change-over switch 24 is changed over to the contact 24a; and the contact 25c of the change-over switch 25 is changed over to the contact 25b, thereby to establish a monitor mode. Consequently, an analog signal supplied to the input terminal 1 is processed by predetermined processing by the recording system and then supplied to the magnetic heads 8a and 8b of the magnetic head 8 by way of the change-over switch 7 so that such record tracks Tr$_1$ to Tr$_{24}$ as shown in FIG. 8 are formed by the magnetic heads 8a and 8b.

Then, the record data thus recorded by the magnetic heads 8a and 8b are reproduced immediately from the record tracks Tr$_1$ to Tr$_{24}$ by the magnetic head 8aa and 8ba, respectively.

With the modified digital audio tape recorder having the construction described above, similar effects to those of the digital audio tape recorder of the first embodiment can be obtained.

Further, while it has such a simple construction that the new magnetic heads 8aa and 8ba are provided on the rotary head 8 and it additionally includes the change-over switch 25, data can be recorded while making a confirmation thereof.

It is to be noted that, while, in the embodiments described above, the number of channels has been described as 2, it is a matter of course that, if the number of channels is an even number like 4 channels, 6 channels, 8 channels or 10 channels, the present invention can be applied by increasing the number of magnetic heads.

Having now fully described the invention, it will be apparent to one of ordinary skill in the art that many changes and modifications can be made thereto without departing from the spirit and scope of the invention as set forth herein.

What is claimed is:

1. An information recording and reproducing apparatus, comprising:

a rotary drum having a pair of recording and reproducing magnetic heads for recording and reproducing record data onto and from a recording medium in a two-track completion interleave condition;

recording circuit means for supplying record data of a plurality of channels in a two-track completion interleave condition to said recording and reproducing magnetic heads;

reproducing circuit means for processing record data reproduced by said recording and reproducing magnetic heads;

record data replacing means for receiving reproduction data processed by said reproducing means and replacement record data to be re-recorded to a selected portion of a selected channel of record data recorded on a recording medium being reproduced by said rotary head, replacing the received reproduction data at the selected portion of the selected channel of the record data with the replacement record data and outputting the resulted data to said recording circuit means; and a pair of recording magnetic heads having a width substantially equal to the width of record tracks on the recording medium and disposed on said rotary drum at mounting heights lower than said recording and reproducing magnetic heads with lower edges thereof aligned to lower edges of record tracks of the recording medium for recording the record data outputted by said record data replacing means onto the record tracks of the recording medium, from which the corresponding record data have been reproduced by said magnetic heads.

2. An information recording and reproducing apparatus as claimed in claim 1, wherein said recording magnetic heads are disposed at locations spaced by 90 degrees in phase from said recording and reproducing magnetic heads.

3. An information recording and reproducing apparatus as claimed in claim 1, wherein said record data replacing means is a digital mixer.

4. An information recording and reproducing apparatus as claimed in claim 1, further comprising first switch means for selectively connecting said recording magnetic heads to said recording circuit means in response to an operation mode of said information recording and reproducing apparatus such that, when said information recording and reproducing apparatus is in a recording or reproduction mode, said recording magnetic heads are disconnected from said recording circuit means, but when said information recording and reproducing apparatus is in a postrecording mode, said recording magnetic heads are connected to said recording circuit means.

5. An information recording and reproducing apparatus as claimed in claim 4, further comprising second switch means for rendering said record data replacing means effective in response to the postrecording mode but rendering said record data replacing means ineffective in response to the recording or reproduction mode.

6. An information recording and reproducing apparatus as claimed in claim 4, further comprising third switch means for connecting said reproducing circuit means to said record data replacing means in response to the postrecording mode but disconnecting said reproducing circuit means from said record data replacing means in response to the recording or reproduction mode.

7. An information recording and reproducing apparatus as claimed in claim 4, further comprising fourth switch means for cooperating with said first switch means to connect said reproducing circuit means to said recording magnetic heads in response to a monitor mode of said information recording and reproducing apparatus in which said recording magnetic heads act as reproducing magnetic heads but to disconnect said reproducing circuit means from said recording magnetic heads in response to the recording, reproduction of postrecording mode.

8. An information recording and reproducing apparatus as claimed in claim 1, wherein the width and construction of the recording magnetic head are the same as the width and construction of the recording and reproducing magnetic head.

* * * * *